(12) United States Patent
Zahm et al.

(10) Patent No.: US 7,034,898 B1
(45) Date of Patent: Apr. 25, 2006

(54) MOBILE TELEVISION RECEIVER

(75) Inventors: Michael Zahm, Waldbronn (DE); Stefan Koehler, Keltern (DE); Erich A. Geiger, Kaempfelbach (DE); Hermann Link, Donaueschingen (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 451 days.

(21) Appl. No.: 09/783,939

(22) Filed: Feb. 15, 2001

(30) Foreign Application Priority Data

Feb. 16, 2000 (DE) .................................. 100 06 701

(51) Int. Cl.
*H04N 5/44* (2006.01)
(52) U.S. Cl. ..................................................... 348/725
(58) Field of Classification Search ................ 348/705, 348/706, 725, 726–728, 731–732, 735, 565, 348/737; 455/277.1, 277.2, 134, 135; 375/347, 375/343, 267
See application file for complete search history.

(56) References Cited

U.S. PATENT DOCUMENTS

| | | | | |
|---|---|---|---|---|
| 3,795,764 A | * | 3/1974 | Altmann ...................... | 348/485 |
| 4,158,858 A | * | 6/1979 | Janssen ....................... | 348/484 |
| 4,837,623 A | | 6/1989 | Motoyama .................. | 358/165 |
| 5,045,948 A | * | 9/1991 | Streck et al. ............... | 348/734 |
| 5,056,153 A | * | 10/1991 | Taniguchi et al. ............ | 455/89 |
| 5,291,519 A | * | 3/1994 | Tsurumaru ................... | 375/320 |
| 5,313,660 A | * | 5/1994 | Lindenmeier et al. ...... | 455/135 |
| 5,325,403 A | * | 6/1994 | Siwiak et al. ............... | 375/100 |
| 5,335,010 A | * | 8/1994 | Lindemeier et al. ......... | 348/706 |
| 5,490,165 A | * | 2/1996 | Blakeney, II et al. ....... | 375/205 |
| 5,526,062 A | * | 6/1996 | Harford ...................... | 348/727 |
| 5,557,338 A | * | 9/1996 | Maze et al. ................. | 348/565 |
| 5,625,876 A | * | 4/1997 | Gilhousen et al. .......... | 455/33.3 |
| 5,818,543 A | * | 10/1998 | Lee ............................. | 348/725 |

(Continued)

FOREIGN PATENT DOCUMENTS

| | | |
|---|---|---|
| DE | 41 01 629 A1 | 7/1992 |
| DE | 197 39 898 A1 | 3/1999 |
| DE | 29911085 | 9/1999 |

(Continued)

OTHER PUBLICATIONS

He et al., A MAC protocol supporting wireless video transmission over Multi-code CDMA personal communication networks, Mar. 27, 1998, 1998 Elsevier Science, Computer Communications 21 (1998)1256-1268.*

(Continued)

*Primary Examiner*—Paulos M. Natnael
(74) *Attorney, Agent, or Firm*—O'Shea, Getz & Kosakowski, P.C.

(57) ABSTRACT

The receiving device contains at least two television channel selection devices to convert high-frequency signals into intermediate-frequency signals, at least two video demodulation devices to convert the intermediate-frequency signals into picture signals, at least two audio demodulation devices to convert the intermediate-frequency signals into audio signals, and one intermediate-frequency switching device to switch the audio- and video-demodulation devices to the television channel selection devices.

12 Claims, 2 Drawing Sheets

U.S. PATENT DOCUMENTS

| | | | | |
|---|---|---|---|---|
| 6,038,425 | A | * | 3/2000 | Jeffrey .......................... 725/80 |
| 6,047,019 | A | * | 4/2000 | Ishii ............................ 375/206 |
| 6,134,223 | A | * | 10/2000 | Burke et al. ................. 370/265 |
| 6,141,536 | A | * | 10/2000 | Cvetkovic et al. ............ 455/45 |
| 6,147,713 | A | * | 11/2000 | Robbins et al. ............. 348/555 |
| 6,259,443 | B1 | * | 7/2001 | Williams, Jr. ............... 345/741 |
| 6,385,390 | B1 | * | 5/2002 | Kim et al. .................... 386/96 |
| 6,441,847 | B1 | | 8/2002 | Link et al. .................. 348/180 |

FOREIGN PATENT DOCUMENTS

| | | |
|---|---|---|
| EP | 0 737 007 A2 | 10/1996 |
| WO | WO 96/13120 | 5/1996 |

OTHER PUBLICATIONS

Philip P. Dang and Paul M. Chau, Robust Image transmission over CDMA Channnels, Aug. 2000, IEEE transactions on Consumer Electronics, vol. 46, No. 3, (original manuscript).*

Cyril-Daniel Iskander, and P. Takis Mathiopoulos, Online Smoothing of VBR H.263 Video for the CDMA2000 and IS-95B uplinks, IEEE, transactions on multimedai vol. 6, non. 4, Aug. 2004.*

* cited by examiner

|  | | Switch 9c | | |
|---|---|---|---|---|
|  | | KWE 6 | KWE 7 | KWE 8 |
| Switch 9d | KWE 6 | on | on | on |
|  | KWE 7 | on | on | on |
|  | KWE 8 | on | on | on |

*FIG. 3*

|  | | Switch 9c | | |
|---|---|---|---|---|
|  | | KWE 6 | KWE 7 | KWE 8 |
| Switch 9d | KWE 6 | off | on | on |
|  | KWE 7 | on | off | on |
|  | KWE 8 | on | on | off |

*FIG. 4*

MOBILE TELEVISION RECEIVER

BACKGROUND OF THE INVENTION

The invention relates to television receivers, and in particular to a mobile television receiver for motor vehicles.

Mobile receiving devices, for example radio and television receivers in motor vehicles, encounter the problem that the progressive motion of the vehicle continuously changes the transmission terrain. This can result in a transmitter no longer being received at the currently set frequency. However, the transmitter generally is also available on at least at one other frequency, and thus by switching the receiving device to this frequency (preferably automatically) the transmitter can continue to be heard and seen. However, to switch to an alternative frequency in general, and in particular to switch to this frequency quickly, the alternative frequency must be detected quickly and reliably.

Therefore, there is a need for a mobile television receiver for quickly and easily automatically searching through and tuning in alternative frequencies of a transmitter.

SUMMARY OF THE INVENTION

The invention is characterized by high speed in searching for a transmitter in general, and especially for searching for alternate transmitters. By acquiring the current transmitter terrain quickly and accurately, it makes possible a diversity functionality without signal influence, and a look-ahead alternative selection.

This is achieved especially by a receiving device with at least two television channel selection devices for converting high-frequency signals into intermediate frequency signals, (i.e., at least two so-called TV tuners, which receive the frequencies over the entire frequency band or bands provided for television reception, and convert these into a preferably fixed intermediate frequency). Furthermore, the inventive receiving device comprises at least two video demodulation devices to convert the intermediate frequency signals into video signals, and at least two audio demodulation devices to convert the intermediate frequency signals into audio signals. The intermediate frequency switching device, the audio and video demodulation devices are switched to the television channel selection devices.

The receiving device is preferably equipped with at least two receiving antennas to receive high-frequency signals, and at least one high-frequency switching device to switch the plurality of receiving antennas to the plurality of television channel selection devices. In this way, the television channel selection devices can access several receiving antennas independently of one another, so the receiving antenna with the better reception properties (e.g., better position on the vehicle) with respect to the desired transmitter can be selected.

A video correlation device as well as a label correlation device may be connected to the outputs of the video demodulation devices. In this way reliable transmitter detection can be implemented with little effort, and consequently also the detection of two identical transmitters on different frequencies. The receiving device may also include an audio correlation device that receives the outputs of the audio demodulation devices.

By using conventional video intermediate frequency stages, for example, the video demodulation devices can be designed with the carrier frequencies and filter curves usual in television technology. In a preferred embodiment, the audio demodulation devices are preferably not based on the convention principles of selecting the audio carrier by mixing in a particular frequency position with subsequent band-limited filtering, or switching a discrete filter in such a way that the audio carrier frequency being demodulated falls within the pass band of the filter.

In a preferred embodiment, the audio demodulation device includes a phase control circuit and at least one filter concurrent with the phase control circuit for selection and mirror frequency suppression. The audio demodulation device may also include a field strength detector and/or a quality detector. Therefore, carrier signals can be demodulated in the unfiltered intermediate frequency signal mixture at the output of the particular television channel selection device and/or their amplitude and/or their quality can be determined. This therefore involves a kind of FM/AM radio that can be tuned over the entire intermediate frequency range which the television channel selection device can evaluate, and which is connected to the television channel selection devices without any channel selection based on fixed filters or switchable fixed filters.

In another aspect of the invention, the receiving device may evaluate the level and/or information content of the carrier frequencies of adjacent channels. Of course, adjacent channels in principle can be attenuated by the selection curve of the television channel selection devices, but as a rule they can nevertheless be evaluated. The audio demodulation device therefore can advantageously scan a plurality (e.g., three) television channels (K−1, K, K+1) with a single adjustment of the TV tuners. With most types of searches this triples the search speed.

The detection and evaluation of the carrier frequencies of the immediately adjacent channels can be utilized to reduce the influence of the adjacent channel on the video and/or audio signal in the useful channel. For example, this may be performed by reducing the input amplification of the respective television channel selection device or by fine tuning (detuning) or by changing the filter bandwidths.

To permit various operating modes (e.g., search, adjacent channel suppression, alternative transmitter detection) in dependence on particular parameters, the receiving device may be equipped with an evaluation device to evaluate the output signals of the audio correlation device, and/or of a video correlation device, and/or of the label correlation device, and/or of the field strength detector, and/or of the quality detector. The evaluation device here preferably controls the high-frequency switching device and/or the low-frequency switching device corresponding to the parameters generated by it internally or possibly also inputted externally. Thus, the evaluation device preferably controls the high-frequency switching device and/or the low-frequency switching device in accordance with a selectable operating mode in dependence on the output signals of the audio correlation device and/or of the video correlation device and/or of the label correlation device and/or of the field strength detection device and/or of the quality detector.

Therefore, there is a need for a navigation system that includes a sufficiently updated database with improved availability to provide the route search and destination directions of the navigation system.

BRIEF DESCRIPTION OF THE DRAWING

FIG. 3 is a tabular illustration of switch state information; and

FIG. 4 is a tabular illustration of switch state information.

DETAILED DESCRIPTION OF THE INVENTION

Figure 1:
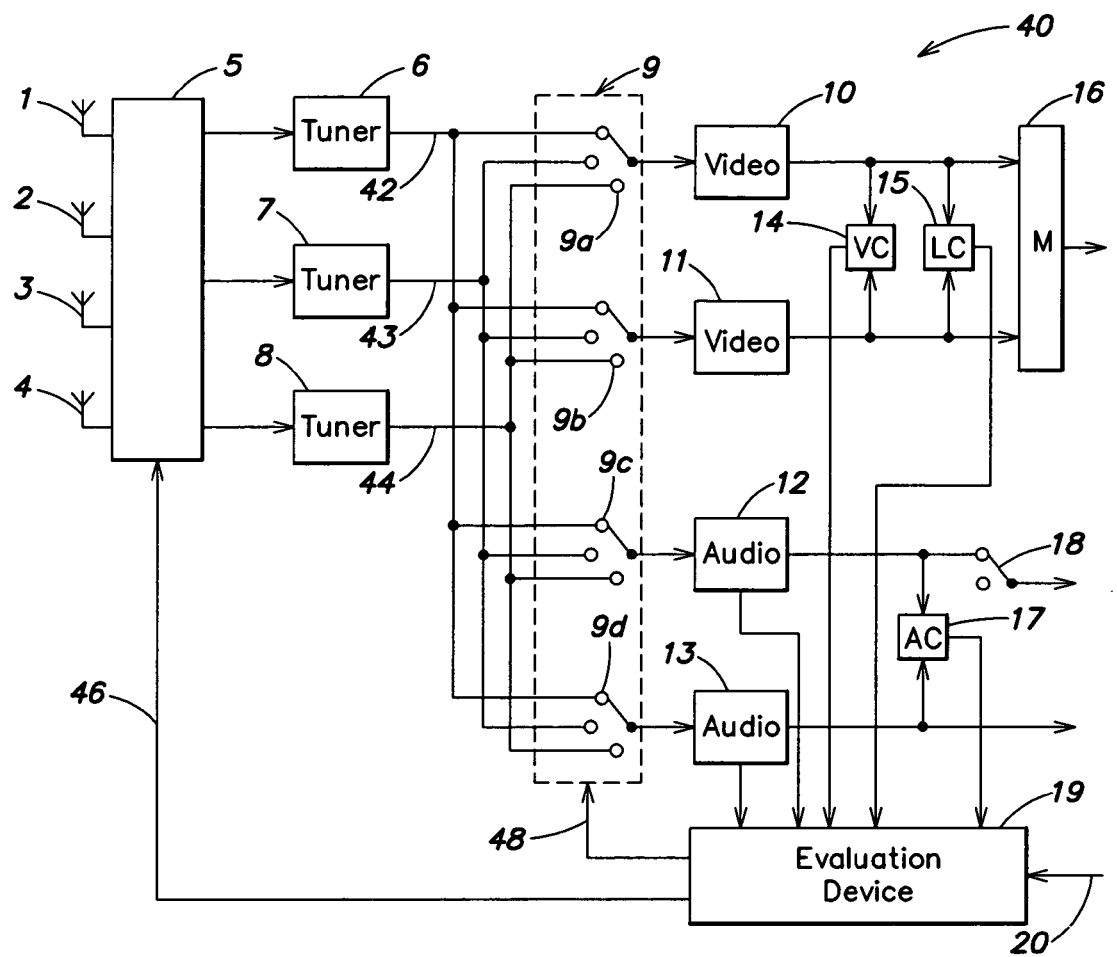
FIG. 1 is a block diagram illustration of a mobile television receiver.

FIG. 1 is a block diagram illustration of a mobile television receiving device 40. The receiving device 40 includes a plurality of antennas 1–4 that are attached for example at different positions on a motor vehicle. Each of the antennas 1–4 provides an associated received signal to a high-frequency switching device 5, which switches the received signals to a plurality of television channel selection devices 6–8. The switching device 5 can route any one of the received signals provided by the antennas to any one of channel selection devices 6–8. For example, the signal from antenna 1 may be provided to channel selection device 8, the signal from antenna 2 may be provided to the selection device 6, while the signal from the antenna 3 may be provided to the selection device 7. The channel selection devices 6–8 each include a mixer (not shown) that converts the high-frequency signal from the particular switched-in receiving antenna 1–4 into an intermediate frequency (IF) signal by mixing it with a mixing signal (not shown), and provides an IF signal on a line 42–44, respectively.

The IF signals on the lines 42–44 are input to a switching device 9 that routes the IF signals to any one of a plurality of demodulators. The demodulators include a plurality of audio demodulators 12, 13 and a plurality of video demodulators 10, 11. Depending on the application each of the video demodulation devices 10, 11 and each of the audio demodulation devices 12, 13 can be connected in a particular way and in various combinations to one of the channel selection devices 6–8. The video demodulation devices 10, 11 are preferably conventional video intermediate frequency stages with the carrier frequencies and filter curves that are customary in television technology. The filters may be implemented for example as surface wave filters (SWF). The details of the audio demodulation devices 12, 13 shall be discussed in more detail hereinafter with respect to FIG. 2.

Each of the video demodulators 10, 11 provides a demodulated video output signal to a video correlation device 14 and a label correlation device 15. The correlation devices 14, 15 compare the demodulated video output signals for agreement of their output signals or of their transmitter labels, respectively. The demodulated output signals are also input to a picture memory 16. The content of the picture memory 16 is transferred for further processing to other units (not shown).

Each of the audio demodulators 12, 13 provides a demodulated audio output signal to a audio correlation device 17, which monitors the outputs of the two demodulators for agreement of their output signals. A selection switch 18 is connected after the outputs of the audio demodulation devices 12, 13, and provides one of the outputs to subsequent units (e.g., a decoder, a low-frequency amplifier, etc.—not shown). Furthermore, as shown in the embodiment, one of the demodulator outputs can be permanently connected to the subsequent units (not shown).

The receiver 40 also includes an evaluation device 19 that receives the output signals from the audio correlation device 17, the video correlation device 14, the label correlation device 15, and the audio demodulators 12, 13. The evaluation device 19 also receives an external operating mode selection signal 20. Based upon the status of the operating mode selection signal 19, the evaluation device 19 provides control signals on lines 46, 48 to control the high-frequency switching device 5 and the intermediate frequency switching device 9, respectively.

Figure 2:
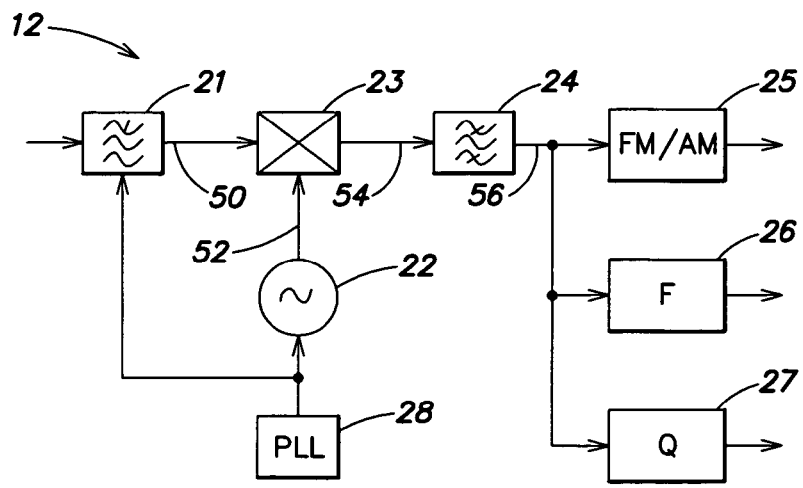
FIG. 2 is a block diagram illustration of an audio demodulator for use in the mobile television receiver illustrated in FIG. 1.

FIG. 2 is a block diagram illustration of the first audio demodulator 12. The second audio demodulator 13 is similar. The demodulator includes a controllable selection filter 21 (e.g., low-pass or band-pass filter) that provides a filtered signal on a line 50 to a mixing stage 23. The mixing stage also receives a signal on a line 52 from a controllable oscillator 22, and provides a mixed signal on a line 54 to a band-pass (BP) filter 24. The BP filter 24 provides a band-pass filtered signal on a line 56 to a demodulator stage 25 for frequency and amplitude demodulation. The signal on the line 56 is also input to a field strength detector 26 and a quality detector 27. These furnish appropriate signals for the evaluation device 19. The selection filter 21 and the oscillator 22 are controlled by a phase control circuit 28 such that the selection filter 21 and the oscillator 22, for example, are "pulled along" with the oscillator of the phase control circuit 28.

The operation of the receiver shall now be discussed in the context of the various operating modes of the system selected based upon the status of the operating mode selection signal 20, either individually or in combination with one another.

1. The audio demodulation device 12, 13 can be tuned to a second audio carrier present in an intermediate frequency signal, which is used to transmit a second tone information. This allows the reproduction of stereo and two-channel transmissions in the corresponding mode. An advantage is that separate quality information and field strength information is now available for each audio carrier, and this information is accessible for further evaluation. The switches 9c and 9d (FIG. 1) of the intermediate frequency switching device 9 (FIG. 1) are used to switch in the audio demodulation devices 12, 13. They can be switched in accordance with FIG. 3, where KWE stands for channel selection device.

2. An audio demodulation device 12, 13 can be switched to the output of another channel selection device 6–8, whereby a tone correlation method for identifying identical program contents can be used. This yields a decision criterion for, for example a frequency diversity process. The switches 9c and 9d of the intermediate frequency switching device 9 that are used to switch the audio demodulation devices 12, 13 may be switched in accordance with FIG. 4, where KWE again stands for channel selection device.

3. An audio demodulation device 12, 13 can be used to determine the current transmitter terrain by scanning through (in combination with the preceding channel selection devices 6–8) the entire television receiving range, and the carriers are detected with their frequency and level. This procedure can run in the background (i.e., without impairing the television transmitter that is set and offered at the same time).

4. An audio demodulation device 12, 13 can be used to control audio and/or video antenna selection in the background. For this purpose the current channel is set with the preceding channel selection device 6–8, and the receiving antennas are switched through sequentially. For every receiving antenna, field strength information is now available for the picture carrier and the audio carrier since the audio demodulation device 12, 13 tunes quickly to the corresponding carriers and measures their amplitudes. Depending on the results, the receiving antenna with the strongest level can be connected to the foreground channel. This technique has the advantage that the receiving antenna is selected without the influence of video or audio signals in the visible foreground signal.

5. An audio demodulation device 12, 13 naturally can also be used to demodulate radio signals. That is, it is not only possible to receive television images and sound, but also to receive radio. For radio reception the preceding channel selection device 6–8 is tuned such that its intermediate frequency output signal contains radio carriers, which are then demodulated by the audio demodulation device.

6. It is also possible to evaluate carrier frequencies of adjacent channels for their level and/or their information content. In principle, adjacent channels can indeed be attenuated through the selection curve of the channel selection devices 6–8. However, their evaluation nevertheless is possible in most cases. With one setting of the channel selection devices 6–8, the audio demodulation device 12, 13, which provides much faster adjustment, can scan three television channels. In certain types of searches this can triple the search speed.

7. The detection and evaluation of the carrier frequencies of immediately adjacent channels can be utilized to reduce the video and audio signal influence of the adjacent channels in the useful channel, for example by reducing the input amplification of the channel selection devices or by fine tuning (detuning) or by changing the filter bandwidths.

A feature of the present invention is that a profile of the current transmitter terrain can be drawn with high speed and, starting from this, suitable measures for optimal reception can be taken quickly.

Although the present invention has been shown and described with respect to several preferred embodiments thereof, various changes, omissions and additions to the form and detail thereof, may be made therein, without departing from the spirit and scope of the invention.

What is claimed is:

1. A mobile receiving device for receiving video/audio high frequency signals, the mobile receiving device comprising:
    at least two channel selection devices for converting the video/audio high-frequency signals into intermediate frequency signals;
    at least two video demodulation devices to convert the intermediate frequency signals into video signals;
    at least two audio demodulation devices to convert the intermediate frequency signals into audio signals;
    an intermediate frequency switching device that selectively connects the at least one of the audio demodulation devices or at least one of the video demodulation devices to a selected one of the channel selection devices in response to a control signal; and
    a video correlation device that receives the video signals and provides a correlated video output signal.

2. The receiving device of claim 1, comprising an audio correlation device that receives the audio signals and provides a correlated audio output signal.

3. The receiving device of claim 2, comprising a label correlation device that receives the video signals and provides a label correlated output signal.

4. A mobile receiving device for receiving video/audio high frequency signals, the mobile receiving device comprising:
    at least two channel selection devices for converting the video/audio high-frequency signals into intermediate frequency signals;
    at least two video demodulation devices to convert the intermediate frequency signals into video signals;
    at least two audio demodulation devices to convert the intermediate frequency signals into audio signals; and
    an intermediate frequency switching device that selectively connects the at least one of the audio demodulation devices or at least one of the video demodulation devices to a selected one of the channel selection devices in response to a control signal; and
    where at least one of the audio demodulation devices comprises a phase control circuit and at least one filter concurrent with the phase control circuit, for selection and mirror frequency suppression.

5. A mobile receiving device for receiving video/audio high frequency signals, the mobile receiving device comprising:
    at least two channel selection devices for converting the video/audio high-frequency signals into intermediate frequency signals;
    at least two video demodulation devices to convert the intermediate frequency signals into video signals;
    at least two audio demodulation devices to convert the intermediate frequency signals into audio signals;
    an intermediate frequency switching device that selectively connects the at least one of the audio demodulation devices or at least one of the video demodulation devices to a selected one of the channel selection devices in response to a control signal; and
    where the at least one audio demodulation device comprises a field strength detector that provides a field strength signal.

6. The receiving device of claim 5, where the at least one audio demodulation device comprises a quality detector that provides a quality signal.

7. The receiving device of claim 3, comprising an evaluation device that receives the correlated audio output signal, the correlated video output signal, the label correlated output signal, and the audio signals and provides first switching control signals to the high-frequency switching devices and second switching control signals to the intermediate frequency switching device.

8. The receiving device of claim 7, where the evaluation device controls the high-frequency switching device and the intermediate switching device in accordance with a selectable operating mode selected by a mode command signal.

9. The receiving device of claim 6, comprising an evaluation device that receives the correlated audio output signal, the correlated video output signal, the label correlated output signal, the field strength signal, the quality signal, the audio signals and provides first switching control signals to the high-frequency switching devices and second switching control signals to the intermediate switching device.

10. A television receiving device for use in a motor vehicle, the receiving device comprising:
    at least two television channel selection devices for converting received high-frequency signals into intermediate frequency signals;
    at least two video demodulation devices to convert the intermediate frequency signals into video signals;
    at least two audio demodulation devices to convert the intermediate frequency signals into audio signals, where each of the audio demodulation devices includes an associated field strength detector and provides a field strength signal indicative thereof;
    a first switching device that receives the intermediate frequency signals and routes each of the intermediate frequency signals to an associated one of the video demodulation devices and an associated one of the audio demodulation devices; and an evaluation device that receives the field strength signals and provides a control signal to control switching of the switching device.

11. A television receiving device for use in a motor vehicle, the receiving device comprising:
- at least two television channel selection devices for converting received high-frequency signals into intermediate frequency signals;
- at least two video demodulation devices to convert the intermediate frequency signals into video signals;
- at least two audio demodulation devices to convert the intermediate frequency signals into audio signals, where each of the audio demodulation devices includes an associated field strength detector and provides a field strength signal indicative thereof;
- a first switching device that receives the intermediate frequency signals and routes each of the intermediate frequency signals to an associated one of the video demodulation devices and an associated one of the audio demodulation devices;
- a plurality of antennae that each receive high frequency signals and provide an associated received high frequency signal; and
- a second switching device that selectively routes each of the received high frequency signals to a uniquely associated one of the at least two television channel selective devices.

12. The television receiving device for use in a motor vehicle of claim 11, further comprising:
- a correlator that receives and correlates the video signals and provides a correlation signal indicative thereof;
- an evaluation device that receives the field strength signals and the correlation signal and provides a first control signal to control switching of the first switching device, and a second control signal to control switching of the second switching device.

* * * * *